US009939082B2

(12) United States Patent
Kunz

(10) Patent No.: US 9,939,082 B2
(45) Date of Patent: *Apr. 10, 2018

(54) LOW POWER SOLENOID ACTUATED VALVE

(71) Applicant: METSO FLOW CONTROL USA INC., Fergus Falls, MN (US)

(72) Inventor: Ross Kunz, Erhard, MN (US)

(73) Assignee: METSO AUTOMATION USA, INC., Fergus Falls, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,265

(22) Filed: Feb. 17, 2017

(65) Prior Publication Data
US 2017/0167627 A1 Jun. 15, 2017

Related U.S. Application Data

(63) Continuation of application No. 14/587,996, filed on Dec. 31, 2014, now Pat. No. 9,671,028.

(51) Int. Cl.
*F16K 31/06* (2006.01)
*F16K 11/07* (2006.01)
(Continued)

(52) U.S. Cl.
CPC ...... *F16K 31/0679* (2013.01); *F16K 11/0712* (2013.01); *F16K 27/041* (2013.01); *F16K 31/0682* (2013.01); *H01F 1/14708* (2013.01); *H01F 7/064* (2013.01); *H01F 7/1638* (2013.01); *Y10T 137/86614* (2015.04); *Y10T 137/86622* (2015.04); *Y10T 137/87885* (2015.04)

(58) Field of Classification Search
CPC ..... Y10T 137/87217; Y10T 137/86622; Y10T 137/86614; Y10T 137/86574; Y10T 137/86879; Y10T 137/86887; Y10T 137/86895; Y10T 137/87885; F16K 11/044; F16K 27/0263; F16K 27/029; F16K 31/0675; F16K 31/0682; F16K 31/0679; F16K 11/0712; F16K 27/041; H01F 7/00; H01F 1/14708; H01F 7/064; H01F 7/1638
USPC .............. 137/596.17, 625.65, 625.64, 625.2, 137/625.48, 625.49, 625.5, 884; 251/129.09, 129.1
See application file for complete search history.

(56) References Cited

U.S. PATENT DOCUMENTS 2,336,887 A 12/1943 Piron
2,689,317 A 9/1954 Timmerman
(Continued)

*Primary Examiner* — Craig J Price
(74) *Attorney, Agent, or Firm* — Nikolai & Mersereau, P.A.; Thomas J. Nikolai

(57) ABSTRACT

A solenoid valve has a housing defining a first axis and second axis, a solenoid which produces a magnetic field along the first axis, a valve shaft movable between a first position and a second position along the second axis, and a manifold mounted to the housing. The valve shaft is biased toward the first position by a spring and mechanical forces sufficient to overcome the force of the spring are transferred from the solenoid to the shaft by a lever to displace the shaft to its second position. A poppet seal affixed to the shaft, which interacts with a portion of the housing to close an outlet port in the housing, and a spool seal, also affixed to the shaft which interacts with a wall of the manifold defining an exhaust port to route fluid to the desired port. An electronic circuit controls delivery of current to the solenoid to shift and hold the shaft in the second position.

12 Claims, 7 Drawing Sheets

(51) Int. Cl.
    *F16K 27/04*    (2006.01)
    *H01F 7/06*    (2006.01)
    *H01F 1/147*    (2006.01)
    *H01F 7/16*    (2006.01)

(56) References Cited

U.S. PATENT DOCUMENTS

| | | |
|---|---|---|
| 3,683,962 A | 8/1972 | Good |
| 3,991,788 A | 11/1976 | Kull |
| 4,168,719 A | 9/1979 | Renshaw |
| 4,268,009 A | 5/1981 | Allen, Jr. |
| 4,305,002 A | 12/1981 | Mortensen |
| 4,527,590 A | 7/1985 | Kolze |
| 4,840,193 A | 6/1989 | Schiel |
| 4,884,720 A | 12/1989 | Whigham et al. |
| 5,048,564 A | 9/1991 | Gaiardo |
| 5,799,696 A | 9/1998 | Weiss |
| 5,899,436 A | 5/1999 | Holmes et al. |
| 6,120,005 A | 9/2000 | Wright |
| 6,712,332 B1 | 3/2004 | Storm |
| 7,226,034 B2 | 6/2007 | Stark et al. |
| 2004/0051066 A1 | 3/2004 | Sturman |

LOW POWER SOLENOID ACTUATED VALVE

CROSS-REFERENCED TO RELATED APPLICATIONS

This application is a continuation application of application Ser. No. 14/587,996, filed Dec. 31, 2014, which is deemed incorporated by reference in its entirety in this application.

STATEMENT REGARDING FEDERALLY SPONSORED RESEARCH OR DEVELOPMENT

Not applicable

BACKGROUND OF THE INVENTION

I. Field of the Invention

The present invention relates to solenoid valves. More specifically, the present invention relates to solenoid valves that have minimal power requirements.

II. Related Art

Valves are commonly used to control the flow of fluids in a hydraulic or pneumatic system. Valves are used to turn flow on or off, modulate flow or to direct flow along alternative paths. Two-port valves, for example, are used to turn flow on or off or to modulate the amount of flow past the valve. Valves with more than two ports typically have (a) either one pressure (inlet) port and multiple outlet ports, or (b) one outlet port and multiple inlet ports. In the first case, the valve is used to connect the inlet port to a selected output port to permit fluid to flow from the inlet to the selected outlet. In the second case, the valve is used to connect the outlet port to a selected input port to permit flow from the selected input port to the output port.

Solenoid valves have two main components, the valve and the solenoid. The solenoid is a helical coil of insulated wire in which an axial magnetic field is established by the flow of electric current through the coil. Many solenoid valves have a plunger and a spring arranged along the axial magnetic field produced by the solenoid. The spring biases the plunger toward a position which closes the valve. Application of current to the solenoid creates a magnetic field sufficient to overcome the force of the spring and open the valve.

A problem with solenoid valves known in the prior art is that a substantial amount of electrical current is required to overcome the force of the spring to move the plunger and then retain the plunger in the open position. This adds to the cost of operation and also makes solenoid valves unacceptable for use in a variety of environments. There is a real need for an efficient solenoid type valve which can operate at low power.

SUMMARY OF THE INVENTION

Solenoid valves made in accordance with the subject invention typically include a housing, an electromagnet, an electronic circuit, a valve assembly and a lever. The housing surrounds the other aforementioned components and defines a first axis and a second axis laterally spaced from and parallel to the first axis. The housing also has a flow path. The flow path has both an inlet and outlet. The outlet is centered on the second axis of the housing.

The electromagnet includes a core and coil assembly. The core is preferably made of a soft magnetic material as opposed to an ordinary mild steel. One example of such a soft magnetic material is an alloy comprising more than 45% nickel and more than 45% iron. The core is positioned within the housing along the first axis. The coil assembly includes at least one helical coil surrounding the core. The coil assembly is electrically coupled to the electronic circuit. The electronic circuit is adapted to apply both a shifting voltage and a holding voltage to the coil assembly. Application of either of such voltages creates a magnetic field along the first axis.

The valve assembly includes a shaft extending between a first end and a second end along the aforementioned second axis. The shaft is movable along the second axis between a first position and a second position. A spring is coupled to the shaft and biases the shaft toward the first position. At least two valves are coupled to and move with the shaft. More specifically, a poppet valve is coupled to the shaft intermediate the first and second ends of the shaft and a spool valve is coupled to the shaft intermediate the poppet valve and the second end.

The lever also comprises an alloy of soft magnetic material. As is the case with the core, an example of a suitable material for the lever is an alloy comprising more than 45% nickel and more than 45% iron. The lever has a receiver and a plate. When positioned in the housing with the other components, the receiver is mated with the first end of the valve assembly's shaft and the plate extends from the receiver over the electromagnet. The plate has an engagement surface facing the electromagnet. The engagement surface of the plate has two end portions, a center portion and a recessed portion between each of the two end portions and the center portion.

When the shaft of the valve assembly is in its first position, there is a gap between the core and the center portion of the engagement surface of the plate. Application by the electrical circuit of the aforementioned shifting voltage to the coil assembly draws the center portion into contact with the core of the electromagnet thereby moving the shaft of the valve from the first position to the second position. The current may then be reduced to a holding current, i.e. a current sufficient to hold the shaft of the valve assembly in the second position.

A manifold is coupled to the housing, i.e., either by integrally forming the manifold with the housing or attaching the manifold to the housing. In either case, the manifold has a pressure path in communication with the inlet of the flow path of the housing as well as both a port path and an exhaust path, which are selectively in communication with the outlet of the flow path of the housing. When the solenoid valve is fully assembled, the poppet valve seats against a portion of the housing when the shaft is in the first position to seal the flow path and the spool valve seals against a portion of the manifold when the shaft is in the second position to seal the exhaust path.

Various other features may be included. For example, the coil assembly may have first and second coils. In such a case, the electronic circuit may be adapted to supply a shifting current to the first coil and a holding current to the second coil. To reduce the current necessarily supplied to the solenoid valve, the electronic circuit may include a charging capacitor which, when discharging, supplies the shifting current. The electronic circuit may also provide a step down of the voltage supplied to the circuit. In most cases, the electronic circuit will provide to the coil a shifting current to overcome the force of the spring and move the shaft to the second position and a holding current to retain the shaft in the second position. The shifting power will typically be higher than the holding power.

The voltages provided to the electronic circuit may vary. For example, the circuit may be adapted to operate at DC voltages in the range of between about 6 volts and 30 volts. Alternatively, the circuit may be adapted to operate at voltages as low as 24 volts direct current to as high as 240 volts alternating current. This enables the solenoid valve to be adapted to accommodate the available power at the location where the valve is to be employed. The electronic circuit ensures that only the minimum power required for operation of the valve is actually employed.

A complete understanding of the invention will be obtained from the following description when read in conjunction with the accompanying drawings.

DETAILED DESCRIPTION

Figure 1:
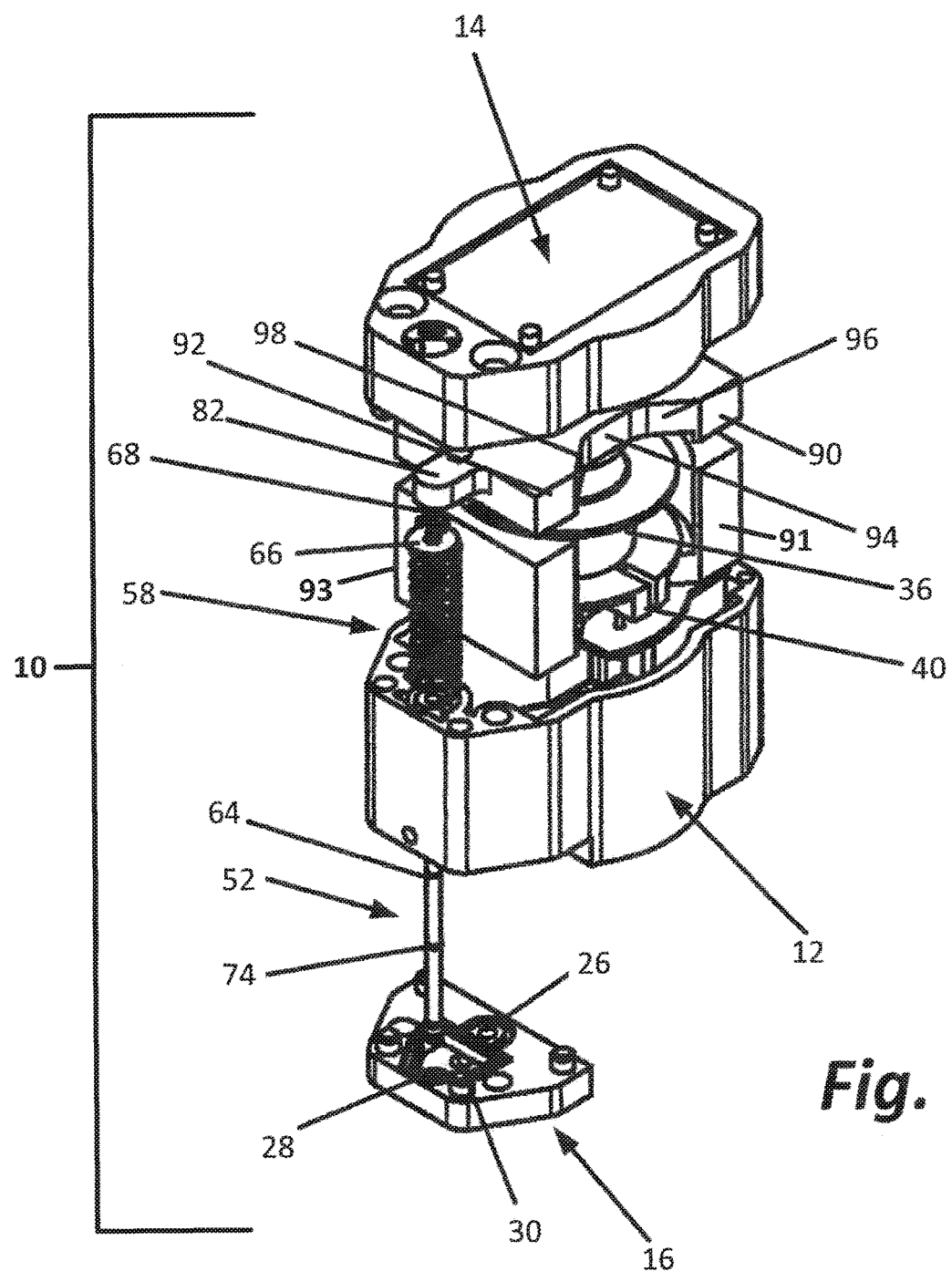
FIG. 1 is an exploded view of a solenoid valve made in accordance with the present invention.

This description of the preferred embodiment is intended to be read in connection with the accompanying drawings, which are to be considered part of the written description of this invention. In the description, relative terms such as "lower", "upper", "horizontal", "vertical", "above", "below", "up", "down", "top", and "bottom", as well as derivatives thereof (e.g., "horizontally", "downwardly", "upwardly", etc.) should be construed to refer to the orientation as then described or as shown in the drawings under discussion. These relative terms are for convenience of the description and do not require that the apparatus be constructed or operated in the orientation shown in the drawings. Further, terms such as "connected", "connecting", "attached", "attaching", "joined", and "joining" are used interchangeably and refer to one structure or surface being secured to another structure or surface or integrally fabricated in one piece, unless expressly described otherwise.

The solenoid valve 10 shown in the drawings includes a housing comprising a base 12 and a cover 14. A separate manifold 16 is also shown. The manifold 16 may alternatively be integrally formed with the base 12.

Figure 3:
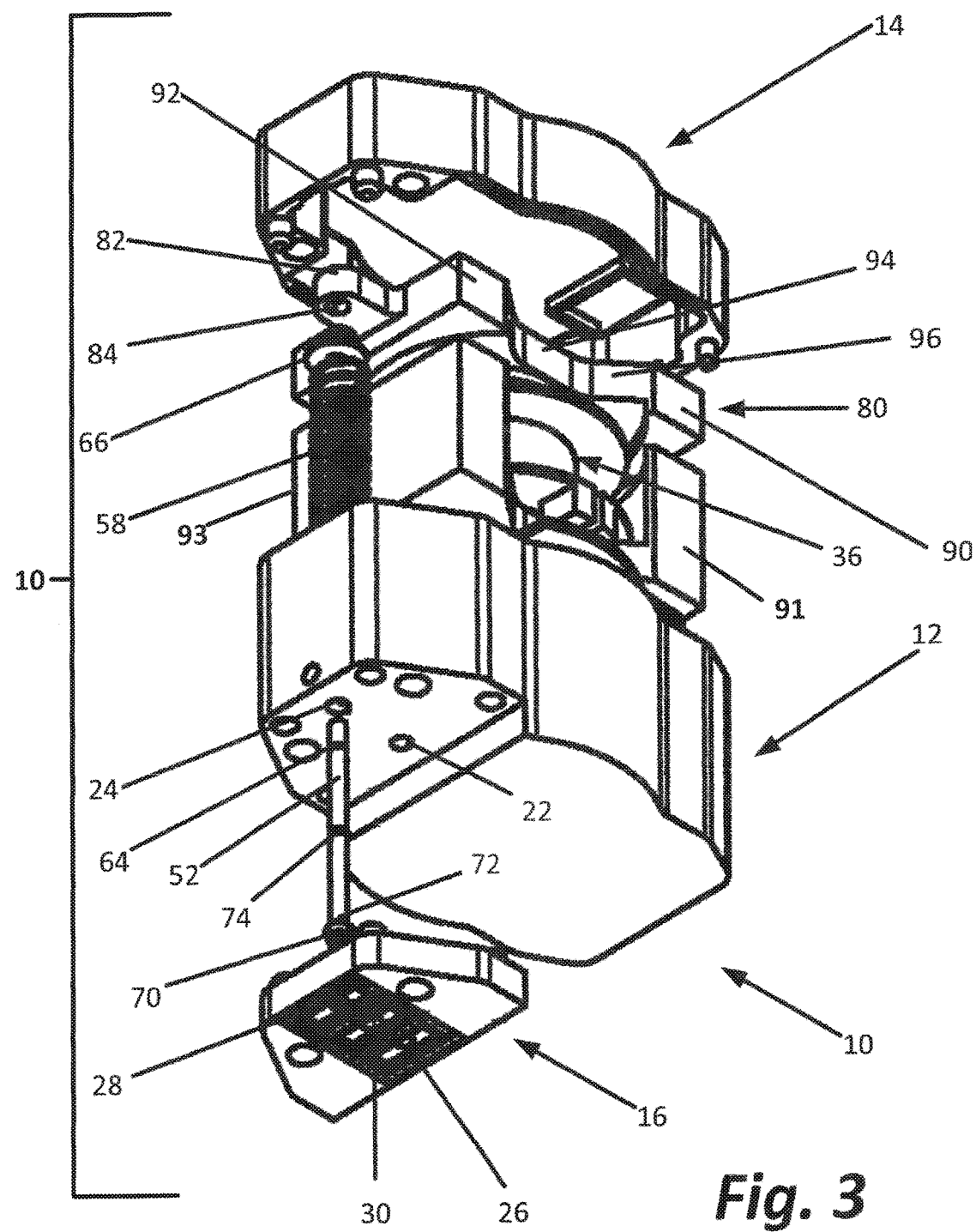
FIG. 3 is an alternative exploded perspective view of the solenoid value of FIG. 1.
Figure 4:
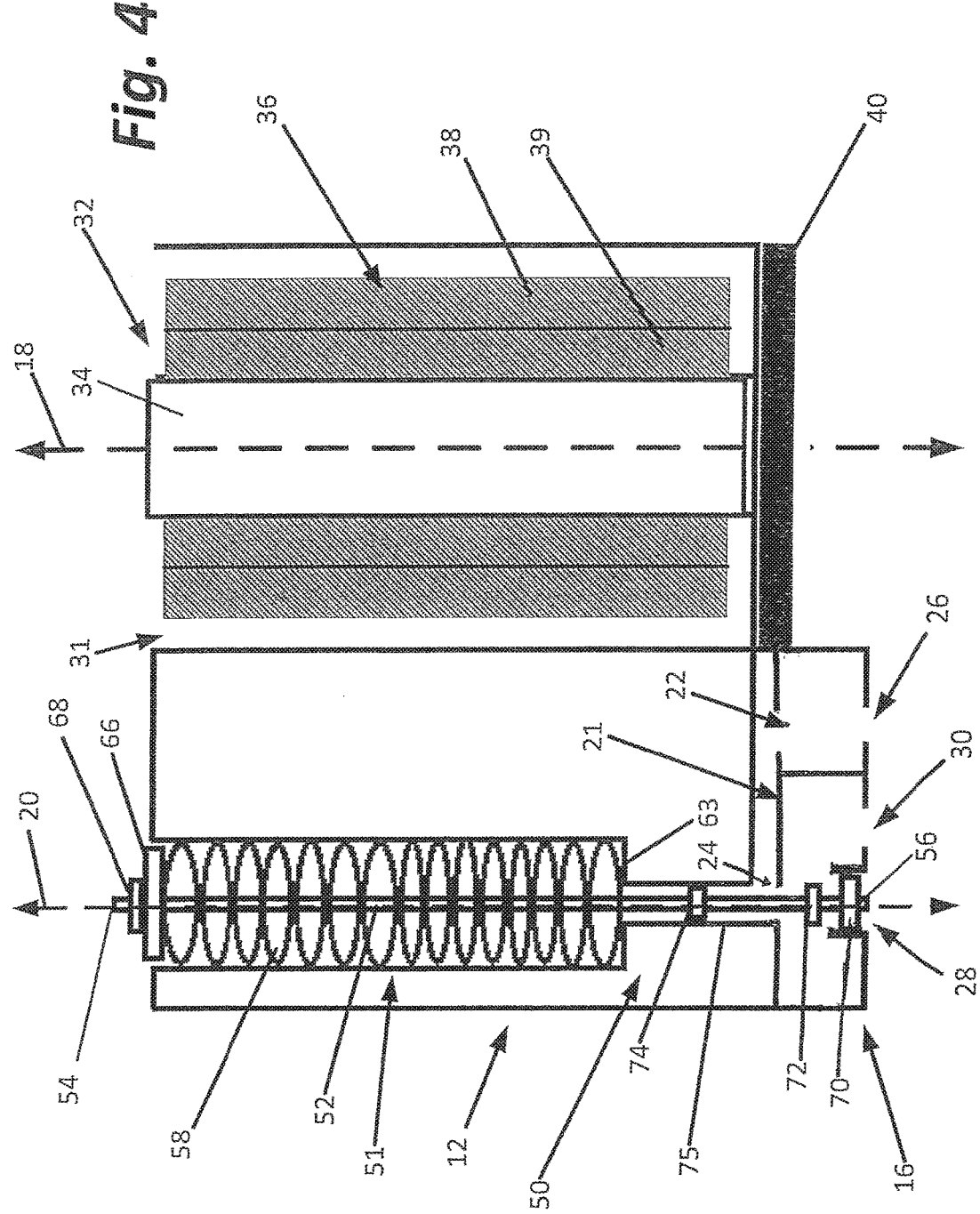
FIG. 4 is a partial schematic, sectional view of the solenoid valve of FIG. 1.

The housing defines a first axis represented by line 18 in FIG. 4 and a second axis represented by line 20 in FIG. 4. In addition to containing the other components of the valve described below, the housing also contains a flow path 21 having an inlet 22 and an outlet 24, as best shown in FIG. 3. The manifold 16 has pressure port 26 coupled to and in communication with the inlet 22. The manifold also has an exhaust path 28 axially aligned with the outlet 24 and a port path 30. The exhaust path 28 and the port path 30 are selectively in communication with the outlet 24 of the flow path of the housing by operation of the valve 10. Associated with the outlet port 24 of the flow channel 21 is a poppet valve 72 and associated with exhaust port 28 is a spool valve 70. When the solenoid is not energized, poppet valve 72 seals the outlet port 24 while the spool valve is open to establish flow from actuator port 30 through exhaust port 28. When the solenoid is energized poppet valve 72 opens while spool valve 70 seals the exhaust port 28 such that fluid at the pressure port 26 passes into flow path 21 via port 22 and flows through outlet port 24 and through actuator port 30.

Centered on the first axis 18 is a magnet channel 31 adapted to hold an electromagnet 32 and a circuit board 40. The electromagnet 32 has a core 34 also centered on the first axis 18. Preferably, the core will be made of a soft magnetic material as opposed to ordinary mild steel. One such soft magnetic material is a metal alloy comprising more than 45% nickel and more than 45% iron. This nickel/iron alloy material is physically durable and reacts well to the cycling of power on and off to the coil(s) such that a substantial magnetic field is only present when electrical energy is applied to the coils. This alloy may be prohibitively expensive in some applications in which case other soft magnetic materials may be employed which have similar characteristics in terms of physical durability and reaction to cycling power on and off. Surrounding core 34 is a coil assembly 36 comprising at least one coil winding 38. A second coil winding 39 may also be provided on the core 34. The core 34 is preferably made of soft magnetic material. An example of such a soft magnetic material is an alloy containing more that 45% nickel and more than 45% iron. One such alloy is available from Carpenter Technology Corporation of Reading, Pa. This alloy is 48% nickel, 0.5% manganese, 0.35% silicon, 0.02% carbon and the remainder of the composition is iron. Other soft magnetic materials suitable for use include a silicon iron or a ferritic stainless steel.

Figure 6:
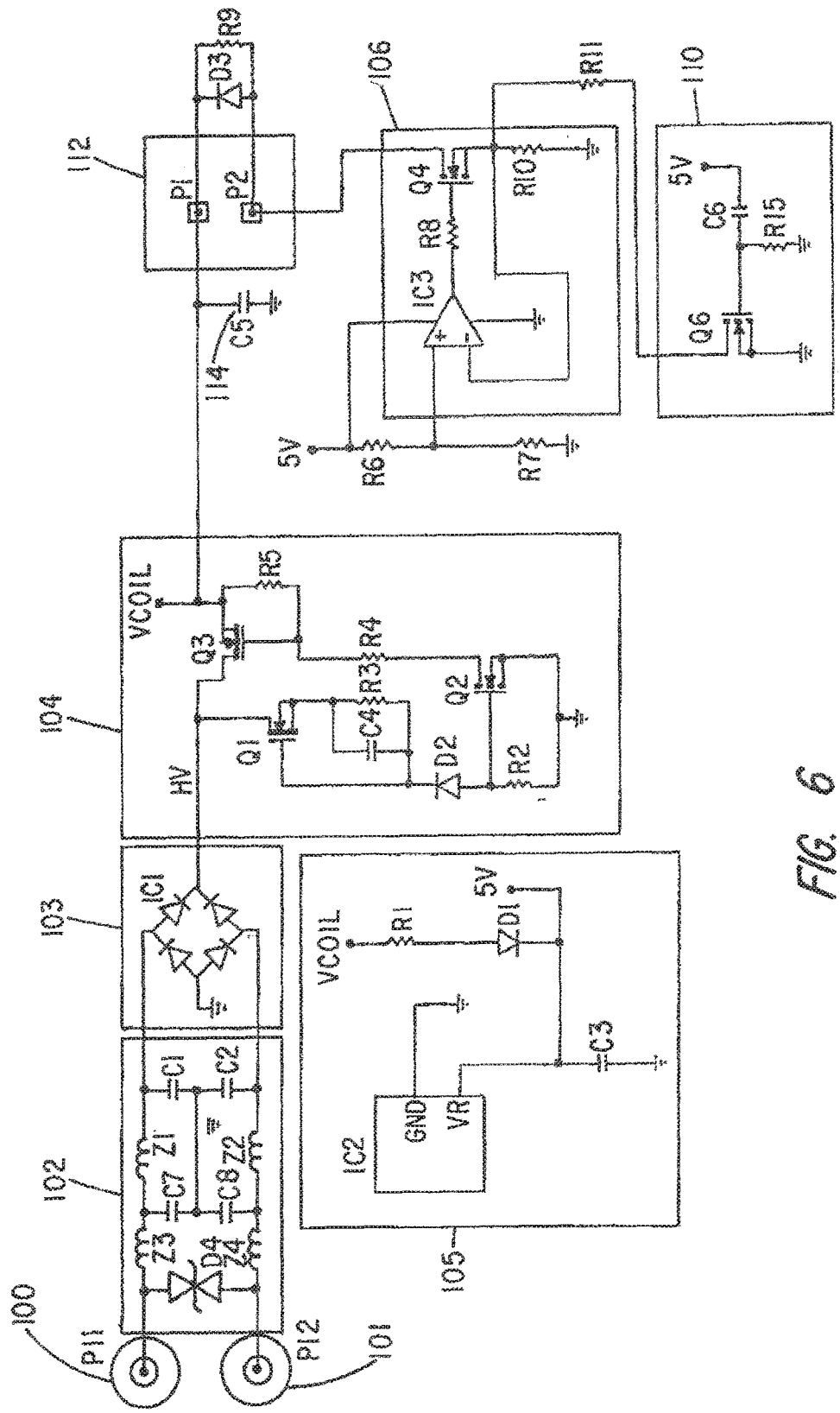
FIG. 6 is a schematic diagram showing a first embodiment of the electronic circuit of the solenoid value of FIG. 1.
Figure 7:
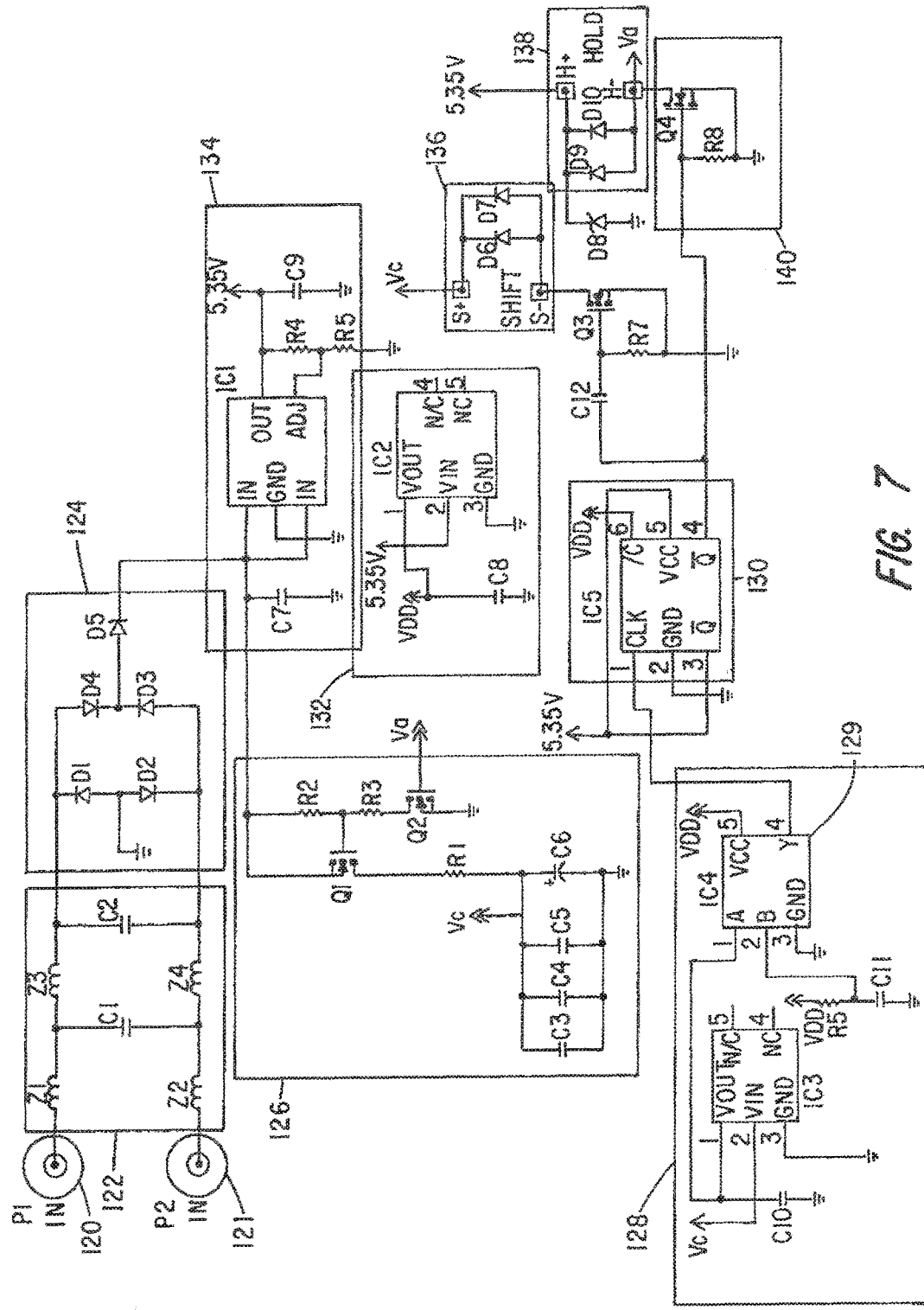
FIG. 7 is a second embodiment of the electronic circuit.

An electronic circuit board 40 is shown in FIGS. 1-4. Two embodiments of the circuit contained on the circuit board 40 are shown in FIGS. 6 and 7. These circuits will be discussed in greater detail below after the mechanical features of the valve are described.

Figure 2:
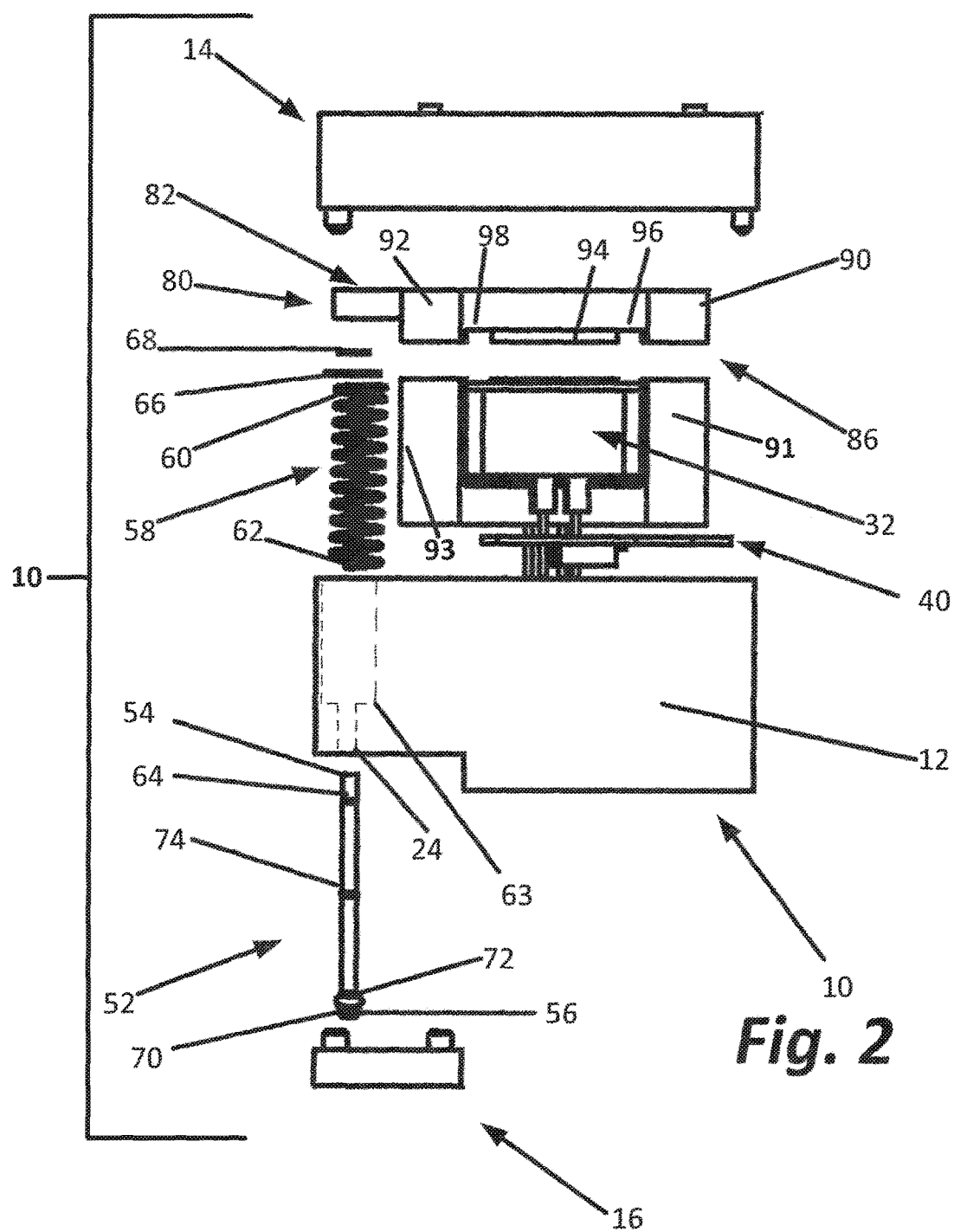
FIG. 2 is an exploded side view of the solenoid valve of FIG. 1.

A valve assembly 50 (FIG. 4) comprises a shaft 52 having a first end 54 and a second end 56. A coil compression spring 58 surrounds the shaft 52. The spring has a first spring end 60 and a second spring end 62 (FIG. 2). When the valve assembly 50 is positioned in a channel 51 in the housing base 12, the second end 56 of shaft 52 is able to pass from above through the exhaust 28 of the manifold. The diameter of the spring 58 is larger than the outlet 24 such that the portion of the base 12 of the housing surrounding outlet 24 acts as a stop 63 against the second end 62 of spring 58. Adjacent the first end 54 of the shaft 52 is a e-clip catching recess 64 which cooperates with a washer 66 and e-clip 68 to couple the first end 60 of spring 58 to the shaft 52. More specifically, the washer 66 is sandwiched between the first end 60 of the spring 58 and the spring clip 68. The e-clip 68 fits into the clip catching recess 64 such that the e-clip 68 is securely affixed to the shaft 52. In this fashion, the compression spring 58 is coupled to the shaft 52 between the stop 63 that surrounds outlet 24 and the washer 66. The force of the spring 58 against the washer 66 and the portion of base 12 surrounding outlet 24 biases the shaft 52 upwardly toward a first position.

Several other significant features are associated with shaft 52. First, a spool valve or seal 70 surrounds the shaft 52 intermediate the first end 54 and the second end 56 of the shaft 52. As shown in the drawings, the spool valve 70 is proximate the second end 56 of the shaft 52. Second, a poppet valve or seal 72 surround the shaft 52 intermediate the first end 54 of the shaft 52 and the spool valve 70. In the drawings, the poppet valve 72 is proximate the spool valve 70. A shaft seal 74 may also be provided between the first end 54 of the shaft and the poppet valve 72.

The spacing of these three seals along the shaft 52 is dictated by the geometry of the base 12 and manifold 16. Specifically, the poppet valve 72 must be able to fully engage and seal against the wall surrounding outlet 24 of the base 12 of the housing when the shaft is in the first position, i.e., the position caused by the biasing force of the spring 58. Further, when the shaft 52 is forced down into a second position by energization of the solenoid coil 32, the poppet valve 72 opens while the spool valve 70 seals within the bore for the exhaust path 28 of the manifold 16. Further still and with reference to FIG. 4, the shaft seal 74 must at all times be above the location where the channel from the inlet 22 of the base 12 intersects the channel in which the shaft 52 resides so that flow is direct from inlet 22 to outlet 24 and fluids do not pass through the other portions of the housing. The shaft seal 74 engages a wall section 75 of the base 12 between the stop 63 and the flow path 21 which partially defines the channel 51 in which the shaft 52 resides.

Based on the foregoing description, it should be clear that when the shaft 52 is raised by action of the compression spring 58 into the first position, the poppet valve 72 seals against the portion of the base 12 surrounding the outlet 24 and shaft seal 74 seals against the wall section 75. Thus, flow from the pressure port 26 and inlet 22 is blocked. Likewise, when the force of spring 58 is overcome and the shaft is move downwardly into the second position, the poppet valve 72 unseals, the spool valve seals against the wall of the manifold surrounding the exhaust path 28, and the shaft seal 74 still is sealed against the wall section 75. Thus, fluids are able to flow along a path from the pressure port 26 of the manifold, through the inlet 22, the flow path 21 and the outlet 24 of the housing and out the actuator port path 30 of the manifold. The shaft seal 74 prevents flow into other portions of the housing and the spool valve 70 prevents flow out the exhaust port 28.

Of course, some mechanism must be provided to overcome the force of spring 58 (a) to move the shaft 52 from its first elevated position to its second position seen in FIG. 4 and (b) then hold the shaft 52 in its second position. In the embodiment illustrated in the drawings, this mechanism comprises the electromagnet 32 working in conjunction with a lever 80.

Figure 5:
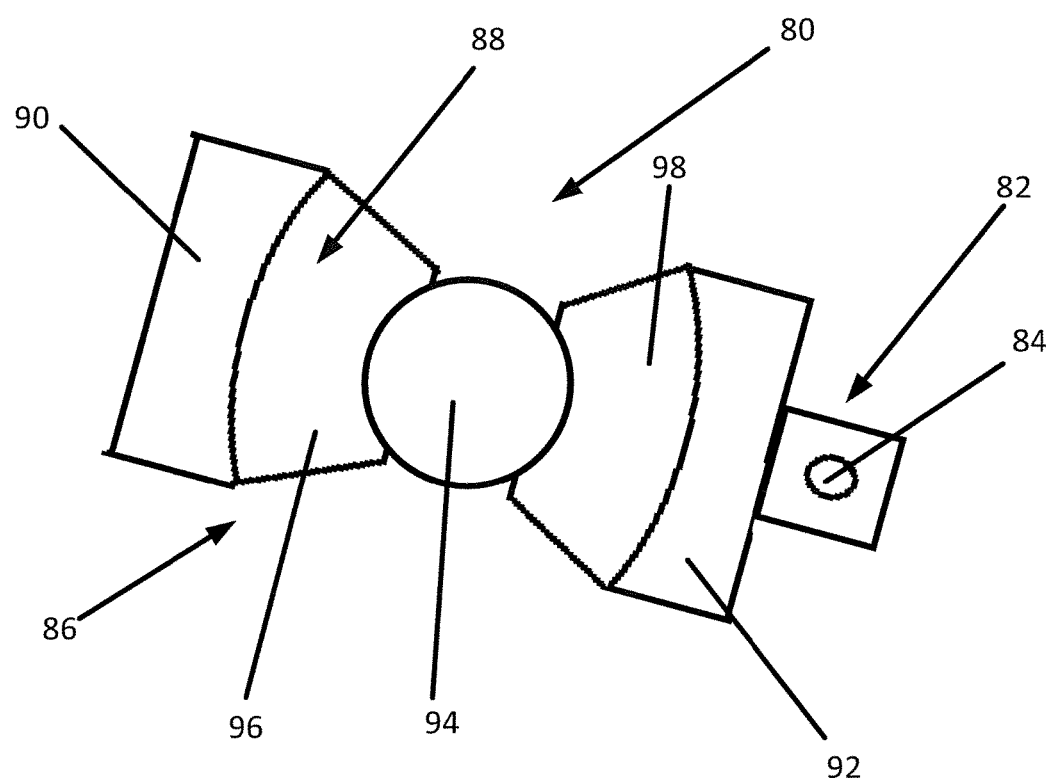
FIG. 5 is a bottom view showing the engagement surface of the lever of the solenoid valve of FIG. 1.

The lever 80, illustrated in FIG. 5, is made of a material which is the same or similar to the soft magnetic material of the core. The material must be physically durable to prevent flaking and erosion of the lever 80 and core 32. The lever 80 has a receiver 82. The receiver 82 has a recess 84 which receives and mates with the first end 54 of the shaft 52. The lever also includes a plate 86 extending from the receiver 82. The plate 86 has an engagement surface 88 which faces the electromagnet 32. The engagement surface 88 has two end portions 90 and 92, a center portion 94 and two recessed portions 96 and 98. Recessed portion 96 is located between the center portion 94 and the end portion 90. Recessed portion 98 is located between the center portion 94 and the end portion 92.

When assembled, the engagement surface 88 of the plate 86 is over and in the face-to-face relation with the electromagnet 32. More specifically, the center portion 94 of the plate 86 resides over the core 34 of the electromagnet 32 and the recessed portions 96 and 98 reside over the coil assembly 36. Cover 14 is adapted to hold end portion 90 of lever 80 in constant contact with one of a pair of spacer blocks 91, 93 in the housing 12 to reduce the effective air gap. Further, the first end 54 of shaft 52 resides in the recess 84 of receiver 82. When the electromagnet 32 is not sufficiently energized to overcome the force of spring 58, such that the shaft is urged by spring 58 to its first position, the shaft 52 holds the engagement surface of the plate 86 away from and at an angle to the upper end of electromagnet 32 such that there is a gap between the top of the core 34 and the center portion 94 of the lever 80. When the electromagnet 32 is energized, a magnetic field is created which attracts the plate 86 down until the center portion 94 comes into contact with the core 34. In this fashion, the lever 80 and the electromagnet 32 cooperate to apply a downward force to the shaft 52 sufficient to overcome the force of spring 58, thereby moving the shaft 52 from its first elevated position to its second lowered position. When power to the electromagnet 32 is shut off (or reduced below the level required to hold the shaft 52 in the second position), the spring 58 returns the shaft 52 to the shaft's first elevated, de-energized position.

Application of power to the electromagnet 32 is controlled by the circuitry on circuit board 40. FIGS. 6 and 7 show two alternative circuit arrangements. Both circuits are designed to provide a first shifting current to the electromagnet 32. When this first shifting current is applied, the electromagnet 32 and lever 80 cooperate to shift the shaft 52 from its first position to its second position. Both of these circuits are also able to provide a second holding current to electromagnet 32. The second holding current is less than the first shifting current. While this second holding current is applied, the electromagnet 32 and the lever 80 cooperate to hold the shaft 52 in its second position. When the shaft 52 is to be returned to its first position, power to the electromagnet 32 is cut off by the circuits FIGS. 6 and 7.

The circuits may further provide additional functions. For example, if the coil assembly has a first coil 38 and a second coil 39, the circuit can supply the first shifting current to the first coil and then the second holding current to the second coil. Alternatively, currents can be supplied to both coils 38 and 39 for shifting the shaft 52 from the first position to the second position. Then, the current to one of coils 38 and 39 can be turned off with the current still supplied to the other coil and being sufficient to hold the shaft 52 in the second position.

Further, the circuit may include a charge capacitor which accumulates the necessary shifting voltage. Discharge of the capacitor shifts the shaft 52. The circuit then continues to supply the lower holding power. This arrangement is advantageous if the current supplied to circuit board 40 would otherwise be inadequate to shift the shaft 52 from its first position to its second position. Likewise, when the voltage supplied to circuit board 40 exceeds the requirements for shifting and/or holding, the circuit of circuit board 40 may provide a step down of the voltage. The circuit may also include components which filter and/or rectify the current to convert an AC input into a DC output. Further still, the circuit can operate in DC voltage ranges as low as between about 6 volts and 30 volts. Alternatively, the electronic circuit can be adapted to operate at voltages as low as 24 volts direct current to as high as 240 volts alternating current.

FIG. 6 and FIG. 7 show two alternative circuit arrangements. The circuit of FIG. 6 is employed when a single coil is used. The circuit of FIG. 7 is employed when two coils are used.

In FIG. 6, input voltage signals are supplied to the circuit at solder connections 100 and 101. The voltage is then filtered by an EMI filter 102. Voltage then is applied to an AC to DC bridge rectifier 103. Depending on the particular application, the voltage from the rectifier 103 may be quite high (over 60 v. AC) so it is passed through a stepdown circuit 104 comprising MOSFETS designed to step down the voltage so the voltage at the terminal labeled "vcoil" is in the range of about 55 to 60 volts. The circuitry in box 105 is essentially a 5 volt power supply for the internal electronics.

An op amp current source is illustrated in box 106. The current source circuitry in box 106 ensures the current output to the coil of the electromagnet is consistent through the entire voltage range.

The circuitry in box 110 initially changes the current source in box 106 to a higher current level which provides a higher current to the coil assembly 36 necessary for shifting the shaft 52 of the valve from the first position to the second position. The circuitry in box 110 then changes the current source in box 106 to a lower current level after a time delay determined by C6 and R15 which provides a lower current to the coil assembly 36 to hold the shaft 52 in the second position. The coil 38 of the coil assembly 36 is connected to the circuit at P1 and P2 in box 112. The capacitor 114 stores current pulses from step-down circuit 104 when voltage is low to power the circuit.

The alternative circuit of FIG. 7 is designed to be used with a dual coil electromagnet 32 having both coils 38 and 39. The circuit of FIG. 7 is coupled to an input signal source via connections 120 and 121. An EMI filter is provided in box 122 and an AC to DC bridge rectifier is provided in box 124. The MOSFET switches and capacitors in box 126 are provided to supply power to shift the coil. Voltage detector 128 detects the voltage VC on the capacitors of box 126. The voltage detector has a gate 129 to provide a time delay via R6 and C11 to make sure VDD is stabilized before Vc is connected to the shift coil. The flip-flop 130 controls the on/off state of MOSFET switches Q3 and Q4. The circuitry in box 132 comprises a second voltage detector which turns on the chips. Box 134 is a voltage regulator which supplies 5.35 v to the hold coil 39. Switch Q3 controlled by flip-flop 130 turns circuit 136 on to deliver current to the "shift" coil 38 until Q3 turns off by the time delay provided by C12 and R7. Q4 in box 140 ensures power is delivered to the "hold" coil via circuit 138 until the power to the circuit shuts off. The circuit 140 makes sure Q1 switch transistor in box 126 is shut off whenever Q4 is on. As such, the circuit of FIG. 7 centrally supplies a "hold" current to the first coil 39 until the power to circuit shuts off and turns on the shift coil 38 only when necessary to move the shaft 52 from its first position to second position.

Various modifications may be made without deviating from the invention. For example, the valve has been described as "open" when the shaft is in its first position and "closed" when in its second position. The opposite may be the case. Likewise, the shaft 52 has been described and shown as being on the outlet side of the flow path 21. The shaft 52 could also be placed on the inlet side of the flow path 21. The foregoing description is intended to explain, but not limit the invention as defined by the following claims.

What is claimed is:

1. A solenoid valve comprising:
   a. a housing having a first axis and a second axis laterally spaced from and parallel to each other and a flow path having an inlet and an outlet, said outlet centered on the second axis;
   b. an electromagnet comprising a core made of a first soft magnetic material positioned within the housing along said first axis, and a coil assembly comprising at least one coil surrounding the core;
   c. an electronic circuit coupled to said coil assembly and adapted to selectively apply both a shifting current and a holding current to the coil assembly;
   d. a valve assembly comprising a shaft extending between a first end and a second end along the second axis and movable along the second axis between a first position and a second position, a spring coupled to the shaft and biasing the shaft toward the first position, a poppet valve coupled to the shaft intermediate the first and second ends of the shaft and a spool valve coupled to the shaft intermediate the poppet valve and the second end;
   e. a lever comprising a second soft magnetic material positioned within the housing, said lever having a receiver mating with the first end of the shaft and a plate extending from the receiver over the electromagnet, said plate having an engagement surface facing the electromagnet and, said engagement surface C having a first end portion remote from the receiver held in constant contact with a spacer block fitted within the housing, a second end portion proximate the receiver, a center portion and recessed portions between each of the first and second end portions and the center portion, wherein when the shaft of the valve assembly is in the first position, the lever is at an angle to the core such that there is a gap between the core and the second end portion of the engagement surface of the plate and application by the electronic circuit of the shifting current to the coil assembly draws the second end portion of the engagement surface into contact with the core such that there is no gap there between, thereby moving the shaft from the first position to the second position; and
   f. a manifold coupled to the housing, said manifold having a pressure port path in communication with the inlet of the flow path of the housing, and an actuator port path and an exhaust port path selectively in communication with the outlet of the flow path of the housing, and wherein the poppet valve seats against a portion of the housing when the shaft is in the first position to seal the flow path and the spool valve seals within a bore of the manifold defining the exhaust port path when the shaft is in the second position to seal the exhaust path.

2. The solenoid valve assembly of claim 1 wherein said coil assembly comprises first and second coils and said electronic circuit supplies the shifting current to the first coil and the holding current to the second coil.

3. The solenoid valve assembly of claim 2 wherein the electronic circuit includes a charged capacitor which, when discharged, supplies the shifting current to the first coil.

4. The solenoid valve of claim 1 wherein the electronic circuit provides a step down of the voltage supplied to the electronic circuit.

5. The solenoid valve of claim 1 wherein the electronic circuit provides the shifting current which is higher than the holding current.

6. The solenoid valve of claim 3 wherein said electronic circuit is adapted to operate at DC voltages in a range of between about 6 volts and 30 volts.

7. The solenoid valve of claim 4 wherein said electronic circuit is adapted to operate at voltages as low as 24 volts direct current to as high as 240 volts alternating current.

8. The solenoid valve of claim 1 wherein the first soft magnetic material is a metal alloy comprising more than 45% nickel and more than 45% iron.

9. The solenoid valve of claim 1 wherein the second soft magnetic material is a metal alloy comprising more than 45% nickel and more than 45% iron.

10. The solenoid valve of claim 1 wherein the first soft magnetic material and the second soft magnetic material are the same.

11. The solenoid valve of claim 1 wherein the first soft magnetic material is a silicon iron.

12. The solenoid valve of claim 1 wherein the first soft magnetic material is a ferritic stainless steel.

* * * * *